United States Patent
Herzhoff et al.

[15] 3,677,076
[45] July 18, 1972

[54] METHOD OF MEASURING WEB TENSION

[72] Inventors: Peter Herzhoff, Leverkusen; Hans Gref, Cologne; Wolfgang Schweicher, Leverkusen; Hans Frenken, Leverkusen-Schlebusch; Peter Assenmacher, Schildgen; Dietmar Westen, Opladen, all of Germany

[73] Assignee: Agfa-Gevaert Aktiengesellschaft, Leverkusen, Germany

[22] Filed: Oct. 5, 1970

[21] Appl. No.: 77,908

[30] Foreign Application Priority Data

Nov. 15, 1969 Germany..................P 19 57 485.7

[52] U.S. Cl....................................73/144, 73/37.7, 73/159
[51] Int. Cl. .................................................G01l 5/08
[58] Field of Search.................73/143, 144, 37, 37.6, 37.7, 73/102, 159

[56] References Cited

UNITED STATES PATENTS

| | | | |
|---|---|---|---|
| 3,538,765 | 11/1970 | Jesinghaus et al. | 73/144 |
| 3,201,985 | 8/1965 | Williams | 73/143 |
| 3,439,536 | 4/1969 | Cushman | 73/37.7 X |
| 3,156,109 | 11/1964 | Fieldgate | 73/37 |
| 3,550,828 | 12/1970 | Watson | 73/88.5 R X |
| 3,115,037 | 12/1963 | Forrester | 73/37.7 X |

FOREIGN PATENTS OR APPLICATIONS 445,761  4/1936  Great Britain..........................73/144

Primary Examiner—Charles A. Ruehl
Attorney—Connolly and Hutz

[57] ABSTRACT

The web tension of webs of material guided on rolls is measured and regulated to a constant value. For measuring the web tension, the web is sucked in between two rolls by means of a negative pressure and the curvature of the web resulting therefrom is used as measurement value for the web tension. As an alternative, the curvature of the web is kept constant and the negative pressure used for the sucking-in effect is used as measurement value for the web tension.

3 Claims, 1 Drawing Figure

PATENTED JUL 18 1972
3,677,076
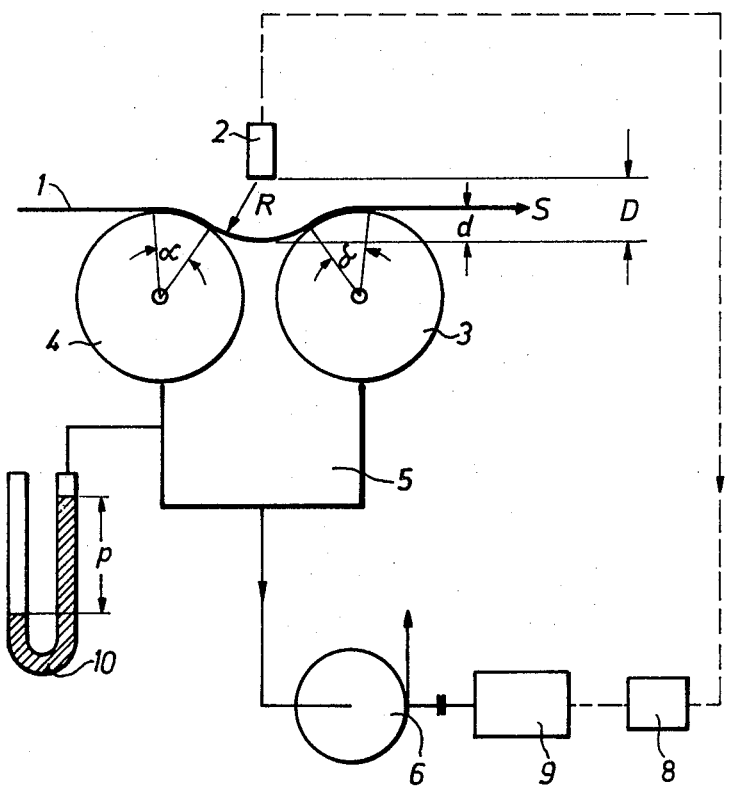
INVENTORS:
PETER HERZHOFF, HANS GREF, WOLFGANG SCHWEICHER, HANS FRENKEN, PETER ASSEN-
MACHER, DIETMAR WESTEN.
BY Connolly and Hutz
their attorneys

METHOD OF MEASURING WEB TENSION

This invention relates to a method of measuring and regulating the web tension of webs of material which are guided on rolls.

When webs are guided in machines, it is desired for many different reasons to measure and regulate locally the development of the web tension. Means for measuring web tension are particularly important in photographic casting and drying installations. In such cases, it should be possible for the web to be guided with different web tensions in the individual sections. In addition, the web may only come into contact with the rolls on the side remote from the photographic layer.

With the guiding of webs over rolls, most of the conventional measurement methods use a roll with a large wrapping angle, the force exerted on the roll and the wrapping angle then representing a standard for the tensile force in the web. The specific web tension (kg/m) is measured in such cases with regard to the width of the web.

A method has recently also become known in which the length of web between two adjacent rolls is acoustically excited up to resonance (U.S. Pat. No. 3,394,587). The web tension can then be determined from the free length of web and the resonance frequency with given tension of the material.

All these methods can only be used with certain web-guiding means and only with the proviso that the web is guided on both sides over rolls. Furthermore, when using these methods, it is only the absolute web tension in kg which is indicated, so that the width of the web always has to be taken into account for establishing the specific web tension.

This invention has for an object to provide a method of measuring the web tension, with which any method of guiding the web can be used and the web itself is only contacted on one side by the guide rolls.

This object is achieved according to the invention by the fact that the web is sucked in between two rolls by means of a negative pressure and the curvature of the web which results therefrom has a fixed relationship to the web tension and the negative pressure, and this is used for regulating the web tension. According to one advantageous way of carrying out the method according to the invention, the negative pressure is kept constant and the curvature of the web is utilized as a measurement value for the web tension.

As an alternative, the curvature of the web is constantly regulated with variable negative pressure and the negative pressure necessary for this purpose is utilized as a measurement value for the web tension. The curvature of the web is established by means of at least one contactless scanning element as known per se. The curvature is advantageously determined from the suction depth $d$ of the web by means of a contactless scanning element.

When the negative pressure is kept constant, the curvature of the web can also be determined from the wrapping angle $\alpha$.

The cavity-forming suction device also provides for the necessary wrapping of the rolls when the web is guided flat, because of the negative pressure. It is thus independent of the path of the web-guiding means. In addition, contact is only made from one side of the web (the back).

It has furthermore been found that, using this method, the specific web tension is directly indicated, i.e. independently of the width of the web material, and always directly in kg/m of web width. By contrast, known methods only indicate the absolute web tension in kg and this has to be converted to the specific web tension by way of the web width.

By means of the measuring method as described and a known arrangement for producing variable web tensions, the web tension can be regulated by a control circuit to the required nominal value.

The method according to the invention is now to be more fully explained by reference to a drawing.

A web 1 of material, of which the tension S is to be measured, is guided over a roll-type cavity-forming suction device, which consists of rolls 3 and 4 and a suction chamber 5. The negative pressure $p$ in the suction device, produced by a fan 6, causes the web to be sucked in to a specific depth $d$ corresponding to the web tension.

In the present case, the distance D and thus the curvature of the web is regulated through the sensing device 2 independently of the web tension to a constant value. Sensing device 2 is, for example of the type described in detail in the following patents: French Pat. Nos. 685,416 and 722,685, German Pat. Nos. 528,186 and 547,835, and British Pat. No. 326,674. A complete description of a suitable sensing device 2 is also contained in the article of M. Raum. Z. techn. Physik, 24, Page 46–53, 1943. The relevant control arrangement consists of a regulator 8 and a speed-controlled motor 9, which is coupled to the fan 6. By way of example, if the prescribed suction depth is reduced by higher web tension, the regulator gives the order for faster running to the direct current motor and thus to the coupled fan. The negative pressure in the suction device is increased until the prescribed distance or spacing is once again obtained. With a reduction in the web tension, the operation is repeated in the reverse direction, The negative pressure being adjusted in the suction chamber is now a standard for the web tension S; this value is thus taken into account in the measurement and is recalibrated into the web tension.

Using the same arrangement, the web tension can also be established by the fact that, through the fan which is variable in speed, the negative pressure in the suction chamber is regulated independently of web tension or suction depth to a constant prescribed nominal value, and the suction depth $d$ and thus the curvature of the web can be measured. The suction depth $d$ can then be directly recalibrated into the web tension.

Instead of using the suction depth, it is also possible to measure the wrapping angle $\alpha$ which the web forms with the roll. For this purpose, hollow rolls for example are used, the surface of these rolls being formed with small holes and the interior thereof communicating with a pressure measuring system. Suitable hollow perforated rolls for each use are described in U. S. Pat. No. 3,013,487, especially FIG. 4, and in U. S. Pat. No. 3,587,962. With a constant negative pressure in the suction chamber, the leakage losses are then proportional to the number of the holes not covered by the web and thus proportional to $360 - \alpha$, so that the wrapping angle $\alpha$ can be determined from the leakage losses. The advantage of this method is that no scanning or sensing elements are necessary. The relationship between web tension S, the negative pressure $p$ and the suction radius R is obtained from the formula $S = p \cdot R$.

If the corresponding dimensions are inserted in this formula, it follows that the web tension S must directly occur as a specific web tension in kg/m. The above formula is only strictly applicable to thin webs of material, with which the resistance of the material can be disregarded. With materials having higher resistance due to fillers, this also has to be taken into account with the calibration curve.

We claim:

1. A device for measuring the tension of a thin web of material guided on rollers comprising a pair of closely spaced rollers, said web being guided over one side of said closely spaced rollers, a suction chamber disposed in sealing engagement with the other side of said closely spaced rollers whereby a negative pressure is developed therebetween which causes said web to deflect inbetween said closely spaced rollers toward said suction chamber, a depth sensing device for determining the distance to which said web is deflected between said closely spaced rollers, suction pumping means connected to said suction chamber for developing a negative pressure therein, a regulating means connected to said suction pumping means, said depth sensing device being connected to said regulating means whereby said regulating means is actuated to maintain said depth of deflection of said web substantially constant, and said regulating means providing an output reading corresponding to the tension in said web.

2. A device as set forth in claim 1 wherein said suction pumping means comprises a fan driven by a variable speed electric motor.

3. A device as set forth in claim 2 wherein said variable speed electric motor comprises a direct current motor.

* * * * *